United States Patent
Sato

(10) Patent No.: US 11,758,282 B2
(45) Date of Patent: Sep. 12, 2023

(54) CONTROL APPARATUS, CONTROL METHOD, AND STORAGE MEDIUM THAT DETERMINE THE DRIVING SPEED OF EACH OF THE APERTURE DIAPHRAGMS OF A PLURALITY OF OPTICAL SYSTEMS

(71) Applicant: CANON KABUSHIKI KAISHA, Tokyo (JP)

(72) Inventor: Akira Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/937,310

(22) Filed: Sep. 30, 2022

(65) Prior Publication Data
US 2023/0106241 A1    Apr. 6, 2023

(30) Foreign Application Priority Data
Oct. 4, 2021 (JP) .................................. 2021-163591

(51) Int. Cl.
| H04N 5/335 | (2011.01) |
| H04N 23/75 | (2023.01) |
| G03B 7/00 | (2021.01) |
| G03B 35/08 | (2021.01) |
| G02B 7/14 | (2021.01) |
| H04N 13/296 | (2018.01) |

(52) U.S. Cl.
CPC .............. *H04N 23/75* (2023.01); *G03B 7/00* (2013.01); *G02B 7/14* (2013.01); *G03B 35/08* (2013.01); *H04N 13/296* (2018.05)

(58) Field of Classification Search
CPC ........................................................ G03B 7/00
See application file for complete search history.

(56) References Cited

U.S. PATENT DOCUMENTS

| 11,463,621 | B2 * | 10/2022 | Tsukamoto | ............ H04N 23/55 |
| 2014/0023355 | A1 * | 1/2014 | Terashima | ........... H04N 13/239 |
| | | | | 359/462 |

FOREIGN PATENT DOCUMENTS

JP      H0843966 A      2/1996

* cited by examiner

*Primary Examiner* — Gary C Vieaux
(74) *Attorney, Agent, or Firm* — Canon U.S.A., Inc. I.P. Division

(57) ABSTRACT

A control apparatus provided in a lens apparatus controls a plurality of optical systems each including an aperture diaphragm which is variable in aperture diameter. A lens control unit sets driving amount information regarding the respective driving amounts of the aperture diaphragms, and sets driving speed of each of the aperture diaphragms based on the driving amount information. The lens control unit determines the driving speeds of the respective aperture diaphragms such that driving times of the aperture diaphragms of the plurality of optical systems match each other.

13 Claims, 6 Drawing Sheets

FIG. 2

CORRECTION DRIVING AMOUNT OF DIAPHRAGM UNIT 102R

| 0 | 1 | 2 | 3 | 4 | 5 | 6 | 7 | ... | 53 | 54 | 55 | 56 |
|---|---|---|---|---|---|---|---|---|---|---|---|---|
| 0 | 0.25 | 0.22 | 0.15 | 0.23 | 0.23 | 0.10 | -0.1 | | 0.23 | 0.20 | 0.17 | 0.15 |

CORRECTION DRIVING AMOUNT OF DIAPHRAGM UNIT 102L

| 0 | 1 | 2 | 3 | 4 | 5 | 6 | 7 | ... | 53 | 54 | 55 | 56 |
|---|---|---|---|---|---|---|---|---|---|---|---|---|
| 0 | 0.10 | 0.08 | -0.03 | 0.05 | -0.12 | 0.11 | 0.13 | | 0.11 | 0.10 | 0.07 | 0.05 |

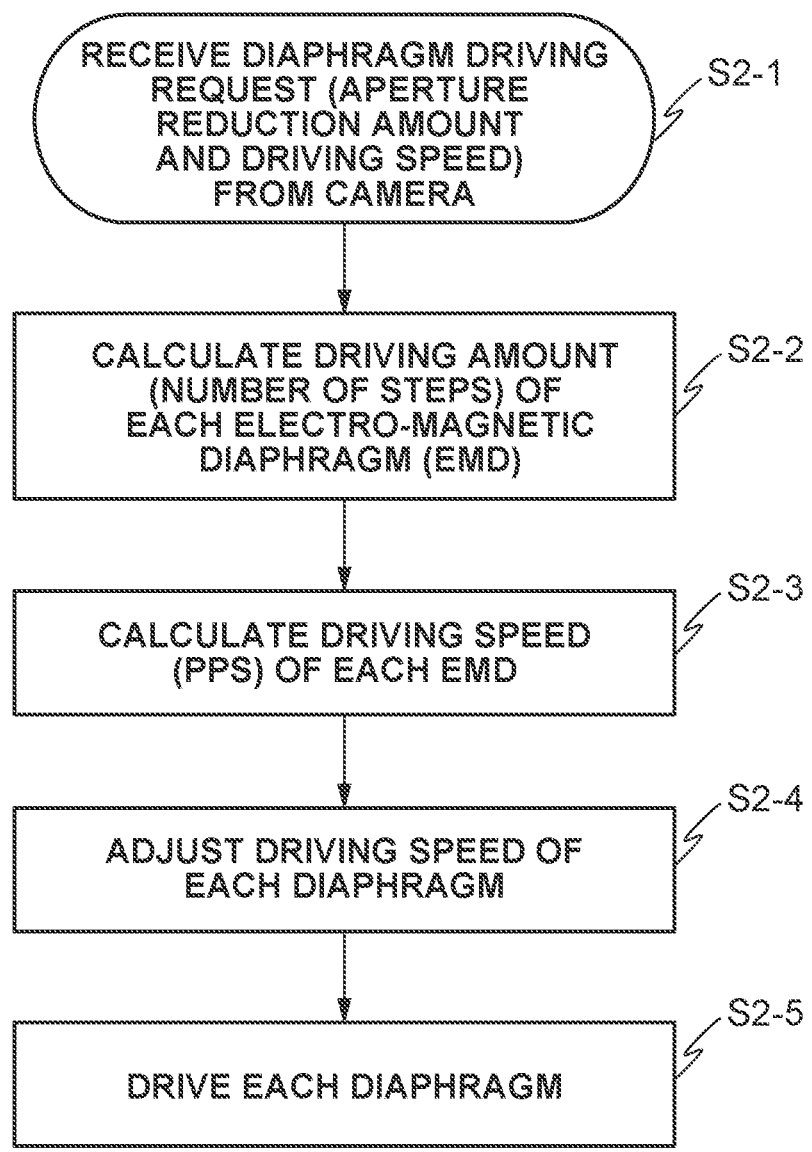

FIG. 5

| STATUS OF RESULT OF CALCULATING DRIVING SPEED OF DIAPHRAGM UNIT 102L \ STATUS OF RESULT OF CALCULATING DRIVING SPEED OF DIAPHRAGM UNIT 102R | NORMAL SETTING | LIMITED BY UPPER LIMIT | LIMITED BY LOWER LIMIT | DRIVING UNNECESSARY |
|---|---|---|---|---|
| NORMAL SETTING | MAINTAIN SPEED (ADJUSTMENT UNNECESSARY) | RECALCULATE SPEED OF DIAPHRAGM UNIT 102L TO MATCH DIAPHRAGM UNIT 102R | RECALCULATE SPEED OF DIAPHRAGM UNIT 102L TO MATCH DIAPHRAGM UNIT 102R | MAINTAIN SPEED (ADJUSTMENT UNNECESSARY) |
| LIMITED BY UPPER LIMIT | RECALCULATE SPEED OF DIAPHRAGM UNIT 102R TO MATCH DIAPHRAGM UNIT 102L | RECALCULATE SPEED TO MATCH DIAPHRAGM UNIT CORRESPONDING TO LONGER TOTAL DRIVING TIME | MAINTAIN SPEED (UNADJUSTABLE) | MAINTAIN SPEED (NOT ADJUSTED) |
| LIMITED BY LOWER LIMIT | RECALCULATE SPEED OF DIAPHRAGM UNIT 102R TO MATCH DIAPHRAGM UNIT 102L | MAINTAIN SPEED (UNADJUSTABLE) | RECALCULATE SPEED TO MATCH DIAPHRAGM UNIT CORRESPONDING TO SHORTER TOTAL DRIVING TIME | MAINTAIN SPEED (NOT ADJUSTED) |
| DRIVING UNNECESSARY | MAINTAIN SPEED (ADJUSTMENT UNNECESSARY) | MAINTAIN SPEED (NOT ADJUSTED) | MAINTAIN SPEED (NOT ADJUSTED) | MAKE SETTINGS NOT TO DRIVE DIAPHRAGM UNITS |

CONTROL APPARATUS, CONTROL METHOD, AND STORAGE MEDIUM THAT DETERMINE THE DRIVING SPEED OF EACH OF THE APERTURE DIAPHRAGMS OF A PLURALITY OF OPTICAL SYSTEMS

BACKGROUND

Field of the Disclosure

The present disclosure relates to a method for controlling each aperture diaphragm provided on an optical apparatus including a plurality of optical systems.

Description of the Related Art

Conventionally, there has been a method by which an image is captured with a camera on which a compound-eye lens unit including a plurality of optical systems is mounted as a method for capturing a stereo three-dimensional video image.

In the compound-eye lens unit, an aperture diaphragm is provided to each optical system (single eye), and the diaphragm may be operated from the camera.

Japanese Patent No. 3428733 discloses a technique regarding aperture diaphragm control in a compound-eye imaging system.

However, it has been revealed that, in controlling the aperture diaphragms in the compound-eye lens unit, an uncomfortable feeling is invoked toward an imaging result if a difference occurs between driving speeds of the aperture diaphragms.

For example, if the aperture diaphragm of each single eye operates at an unsynchronized timing, a change in the aperture amount is also unsynchronized. In this case, a difference may be generated in the timing of change in the amount of light and the timing of change in the depth between a plurality of images acquired by stereo imaging. If such a difference increases, an uncomfortable feeling may be invoked toward a moving image or an image acquired by the stereo imaging.

The technique discussed in Japanese Patent No. 3428733 controls the aperture diaphragms in consideration of light amount distribution but does not take the synchronization of the aperture diaphragms or the like into consideration.

SUMMARY

According to an aspect of the present disclosure, a control apparatus is configured to control a plurality of optical systems each including an aperture diaphragm variable in aperture diameter. The control apparatus includes a speed setting unit configured to set driving speeds of the aperture diaphragms based on driving amount information regarding respective driving amounts of the aperture diaphragms, wherein the speed setting unit determines the driving speed of each of the aperture diaphragms so as to reduce a difference between driving times of the aperture diaphragms of the plurality of optical systems.

Further features of the present disclosure will become apparent from the following description of exemplary embodiments with reference to the attached drawings.

BRIEF DESCRIPTION OF THE DRAWINGS

FIG. 2 illustrates an example of correction driving amount information for each diaphragm.

FIG. 4 is a flowchart of processing of diaphragm driving control according to a second exemplary embodiment.

FIG. 5 is a decision table for substantially matching driving times of a plurality of diaphragms.

DESCRIPTION OF THE EMBODIMENTS

In the following description, exemplary embodiments of an optical system according to the present disclosure and an imaging apparatus including the optical system will be described with reference to the attached drawings.

Figure 1:
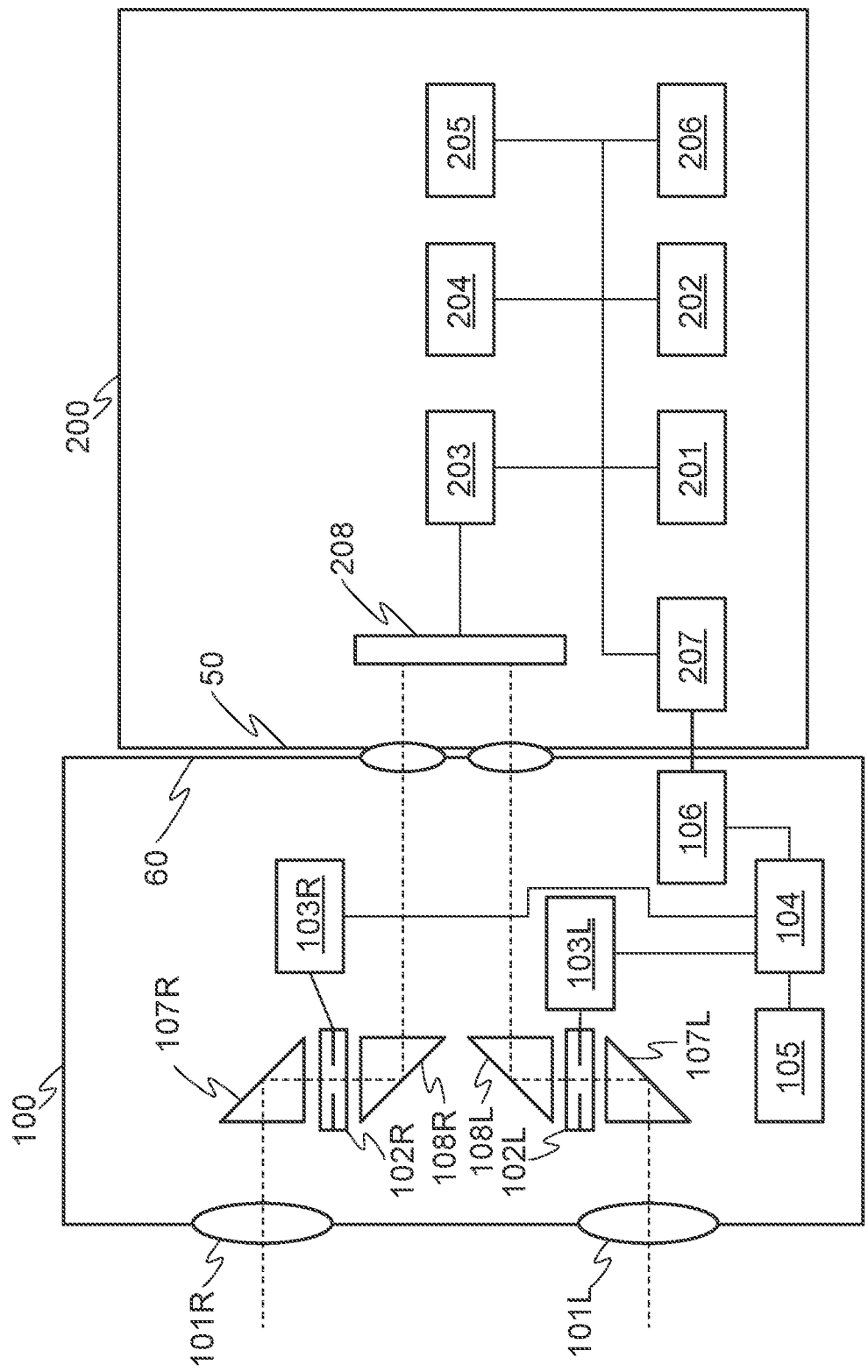
FIG. 1 illustrates a configuration of an imaging system.

FIG. 1 is a block diagram illustrating an interchangeable-lens camera system with a connection established between an interchangeable lens 100 as a lens apparatus and a camera 200 as an imaging apparatus (a camera main body) according to a first exemplary embodiment of the present disclosure. The camera 200 and the interchangeable lens 100 include a camera mount 50 and a lens mount 60, respectively. The camera 200 and the interchangeable lens 100 can supply electric power from the camera 200 to the interchangeable lens 100 and communicate with each other via electric contacts provided on the respective mounts. The camera 200 includes an image sensor 208 that outputs an electric signal obtained by photoelectrically converting two subject images formed by a right-eye lens unit 101R and a left-eye lens unit 101L, which are a plurality of single eyes (optical systems) in the interchangeable lens 100.

The camera 200 further includes an analog-to-digital (A/D) conversion unit 203 that converts an analog electric signal output from the image sensor 208 into a digital signal, and an image processing unit 204 that generates an image by performing various kinds of image processing on the above-described digital signal. The image generated by the image processing unit 204 is displayed on a display unit 205 or recorded in a recording medium 202.

The camera 200 further includes an operation unit 206 that includes a power switch for turning on and off the camera 200, an imaging switch for starting to record an image, a selection/setting switch for setting various kinds of menus, and the like. A camera control unit 201 includes a microcomputer. The camera control unit 201 controls the image processing unit 204 and performs communication with the interchangeable lens 100 in response to a signal from the operation unit 206.

The right-eye lens unit 101R and the left-eye lens unit 101L as the two optical systems of the interchangeable lens 100 include prisms 107R and 108R, and 107L and 108L that change the direction of an optical axis by 90 degrees using reflection, respectively. The interchangeable lens 100 further includes a lens control unit 104 as a driving control unit that controls an aperture diaphragm (a diaphragm unit) and the like in response to a control signal received through camera-lens communication via a camera communication unit 207 and a lens communication unit 106. The lens control unit 104 includes a microcomputer and the like. The lens control unit 104 has a function as a driving amount setting unit that sets driving amount information regarding a driving amount of the diaphragm unit, as will be described below. The lens control unit 104 also has a function as a speed setting unit that sets a driving speed of the diaphragm unit.

Next, a diaphragm mechanism according to the present exemplary embodiment will be described.

The right-eye lens unit 101R and the left-eye lens unit 101L of the interchangeable lens 100 include diaphragm units 102R and 102L, respectively, as aperture diaphragms having variable aperture diameters for changing the amount of light and the depth. The diaphragm units 102R and 102L are electromagnetic diaphragms each using a stepping motor as an actuator thereof. Diaphragm driving units 103R and 103L are provided as driving units for driving the plurality of diaphragm mechanisms. The diaphragm units 102R and 102L according to the present exemplary embodiment are each designed in such a manner that an aperture reduction amount thereof changes in ⅛-exposure value (EV) increments as an aperture value (AV) each time the stepping motor is driven by one step. However, a slight error occurs in the aperture reduction amount (a difference between the number of steps and an ideal aperture reduction amount) due to influences of uneven magnetization of a rotor of the stepping motor, individual differences in precision among mechanism components, and the like. Further, a relationship between the number of steps and the aperture reduction amount may be intentionally changed between the right and left diaphragm units 102R and 102L during a design phase of the right-eye lens unit 101R and the left-eye lens unit 101L. The presence of the difference in the driving amount between the right and left diaphragm units 102R and 102L in this manner may lead to generation of a difference in change in the amount of light and generation of change in the depth between the right-eye lens unit 101R and the left-eye lens unit 101L.

Thus, an imaging system according to the present exemplary embodiment stores correction driving amount information (correction amount information) individually set for each of the diaphragm units 102R and 102L in a storage unit 105. The correction driving amount information according to the present exemplary embodiment refers to a collection of information regarding the driving amount (the number of steps) required to allow each of the diaphragm units 102R and 102L to have a predetermined amount of light or depth.

The correction driving amount information is defined using a result measured in advance in the following manner. Light is transmitted so as to be incident from the subject side on the right-eye lens unit 101R and the left-eye lens unit 101L. Then, a light amount value metered on the image sensor side is actually measured while the aperture is reduced from a maximum aperture state little by little with respect to each of the diaphragm units 102R and 102L. Based on a measured result, the diaphragm driving amount (the number of steps) required to change the aperture amount in ⅛ EV increments is measured and stored for each of the diaphragm units 102R and 102L.

The correction driving amount information according to the present exemplary embodiment is illustrated in FIG. 2. FIG. 2 illustrates merely an example of the correction driving amount information, and the correction driving amount information does not necessarily have to be in such a data format as long as the information is information capable of reducing (correcting) the difference in the aperture value and the driving amount between the diaphragm units 102R and 102L.

As illustrated in FIG. 2, a correction amount (correction driving amount) is individually set for each diaphragm unit. In FIG. 2, the numbers (0 to 56) indicated above square frames are index numbers, and the numerical values indicated inside the frames are correction amounts. For example, in the index number 4, a correction driving amount for driving the aperture diaphragm from the maximum aperture to a position where the aperture is reduced by ⁴⁄₈ EV is stored. The correction amount of the diaphragm unit 102R for the position where the aperture is reduced by ⁴⁄₈ EV is +0.23 steps. This means that, while each diaphragm unit is designed in such a manner that the aperture is ideally reduced by ⅛ EV per step, the aperture can be reduced from the maximum aperture by ⁴⁄₈ EV by the diaphragm unit 102R being driven from a maximum aperture position in an aperture reduction direction by 4.23 steps.

In this manner, correction values to achieve predetermined aperture reduction amounts are stored in a predetermined area in the storage unit 105 (a memory) sequentially from the maximum aperture to the minimum aperture. Then, a desired correction value can be acquired by referring to an address shifted from the first address in the stored data by an amount corresponding to data size×index. In the present exemplary embodiment, the address is referred to in such a manner that the index is incremented by one for each reduction in the aperture by ⅛ EV.

Next, a procedure for driving control of the aperture diaphragms according to the present exemplary embodiment (the first exemplary embodiment) will be described specifically.

Figure 3:
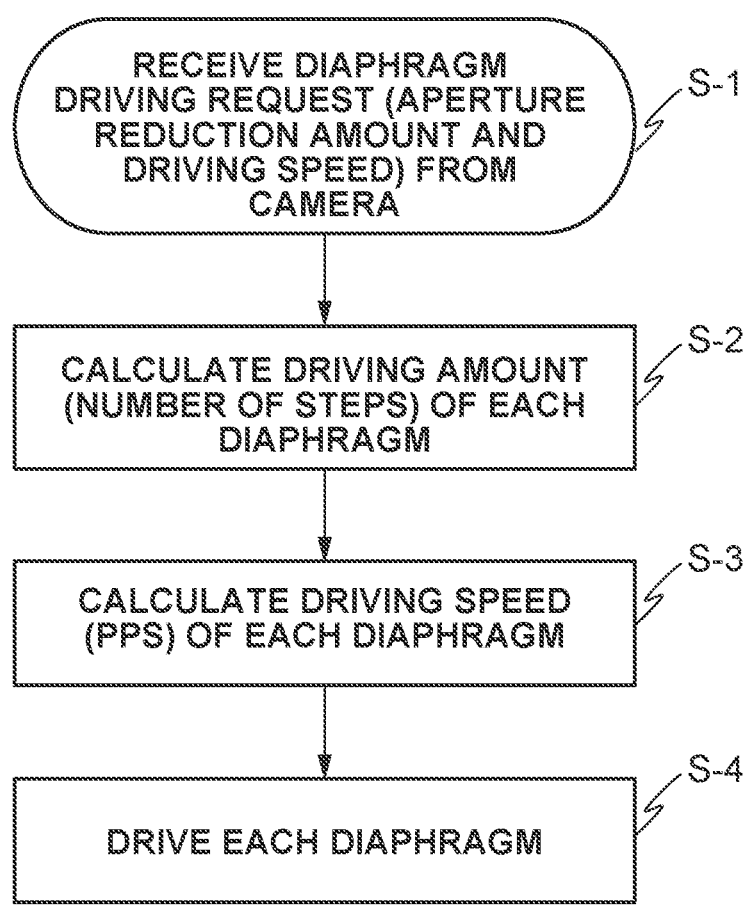
FIG. 3 is a flowchart of processing of diaphragm driving control according to a first exemplary embodiment.

FIG. 3 illustrates a flowchart of processing of the diaphragm driving control according to the present exemplary embodiment. The control method in the present flowchart can be implemented as a program causing a computer to execute the same function. In the present exemplary embodiment, the processing illustrated in FIG. 3 is mainly performed by an internal circuit provided in the interchangeable lens 100. In other words, a control apparatus that controls the diaphragm unit is provided in the interchangeable lens 100 in the present exemplary embodiment.

First, in step S-1, the camera control unit 201 notifies the lens control unit 104 of a diaphragm driving request.

A trigger based on which the lens control unit 104 is notified of the diaphragm driving request from the camera control unit 201 is, for example, when an operation of changing the aperture value is performed on the operation unit 206 by a user or when it becomes necessary to drive the diaphragm to maintain an appropriate exposure by automatic exposure (AE) processing in the camera control unit 201.

In the present exemplary embodiment, the diaphragm driving request from the camera control unit 201 is specified with an aperture reduction amount and a diaphragm driving speed. The aperture reduction amount is specified with an aperture reduction operation amount in the unit of ⅛ EV, and the diaphragm driving speed is specified with a pulse rate (pulses per second (pps)) of driving pulses of the stepping motor of the diaphragm unit 102R or 102L. The diaphragm driving speed specified by the camera control unit 201 is a driving speed in common between the diaphragm units 102R and 102L (a first driving speed).

Next, in step S-2, the lens control unit 104 calculates a diaphragm driving amount corresponding to the specified aperture reduction amount for each of the diaphragm units 102R and 102L.

Now, the method for calculating the diaphragm driving amount will be described specifically. The lens control unit 104 stores information about the present aperture position in the storage unit 105. The aperture reduction amount specified by the camera control unit 201 is an amount equivalent to a differential operation amount from the present aperture position, and therefore the driving amount can be calculated based on a relationship of a target aperture reduction position=the present aperture position+the specified aperture reduction amount.

An example is described where the present aperture-position is the position of ⅜ EV, and the specified aperture reduction amount is ⅖ EV. At this time, the driving amounts of the diaphragm units 102R and 102L are determined in the following manner based on the correction amounts illustrated in FIG. 2.

The present aperture position of the diaphragm unit 102R: ⅜ EV→3.15 steps
The target aperture position of the diaphragm unit 102R: ⅝ EV→5.23 steps
The present aperture position of the diaphragm unit 102L: ⅜ EV→2.97 steps
The target aperture position of the diaphragm unit 102L: ⅝ EV→4.88 steps
The driving amount of the diaphragm unit 102R=2.08 steps
The driving amount of the diaphragm unit 102L=1.91 steps In this manner, in the present exemplary embodiment, different pieces of driving amount information from each other are set for the diaphragm units 102R and 102L based on the correction driving amount information.

Next, in step S-3, the lens control unit 104 calculates the driving speeds of the diaphragm units 102R and 102L.

Suppose that the diaphragm driving speed specified by the camera control unit 201 in step S-1 is 50 pps.

In this case, the lens control unit 104 calculates the driving speeds of the diaphragm units 102R and 102L in the following manner, thereby allowing driving times of the diaphragm units 102R and 102L to be substantially equal to each other. The driving times being equal ideally means that the driving times are the same, but the presence of a small error is allowable.

In the present exemplary embodiment, the lens control unit 104 sets, as a reference, a diaphragm unit for which the diaphragm driving time when the diaphragm unit is driven at the diaphragm driving speed of 50 pps (a first driving time) is longer, and adjusts the driving speed of a diaphragm unit for which the diaphragm driving time is shorter based on the reference, thereby allowing the driving times of the diaphragm units 102R and 102L to be substantially equal to each other.

In this case, the driving time is longer for a diaphragm unit having a greater driving amount, and therefore the diaphragm driving time of the diaphragm unit having the greater driving amount is identified. In the present exemplary embodiment, the diaphragm unit 102R takes a driving time of 41.6 ms when being driven at 50 pps.

At this time, the driving time of the diaphragm unit 102L per pulse is calculated by the following calculation.

The driving time per pulse=41.6 ms/1.91 steps=21.78 ms/pls

Thus, the driving speed of the diaphragm unit 102L is calculated in the following manner.

The driving speed of the diaphragm unit 102L=1000/21.78=45.9 pps

Therefore, the driving speed of the diaphragm unit 102L is determined to be 45.9 pps while the driving speed of the diaphragm unit 102R is 50 pps. Determining the driving speed in this manner can reduce the difference in the driving time compared to when both the diaphragm units 102R and 102L are driven at 50 pps.

In step S-4, each of the diaphragm units 102R and 102L is driven by the diaphragm driving amount and at the driving speed determined in the above-described manner. This allows the diaphragm units 102R and 102L to be driven with the left and right diaphragm driving timings (the driving times) substantially in synchronization with each other with respect to the aperture reduction amount of ⅖ EV and the driving speed of 50 pps specified by the camera control unit 201.

In the case of the present exemplary embodiment, since both the diaphragm driving times of the diaphragm units 102R and 102L are 41.6 ms, matching the driving start timings results in matching the driving completion timings with each other. This can match the start and end timings of the change in the amount of light and the change in the depth between the left side and the right side, thereby allowing reduction of an uncomfortable feeling due to differences in the changes in the amount of light and the depth between the left image and the right image.

The driving speed is recalculated to match the respective total driving times of the diaphragm units in the present exemplary embodiment, and the diaphragm unit used as the reference at this time may be a diaphragm unit of a single eye that captures an image serving as a reference for automatic exposure. This allows the driving timing of the other diaphragm unit to be matched based on the diaphragm unit serving as the photometry reference for the automatic exposure. Thus, it is expected that the diaphragm units 102R and 102L can excellently follow the automatic exposure processing of the camera 200.

Alternatively, the driving speed is recalculated to match the respective total driving times of the diaphragm units in the present exemplary embodiment, and the diaphragm unit used as the reference at this time is set to a diaphragm unit of a single eye that captures an image serving as a reference for in-focus determination. This allows the driving timing of the other diaphragm unit to be matched based on the diaphragm unit serving as the reference for the in-focus determination. Thus, it is expected that the respective in-focus states of the single eyes can be excellently synchronized.

Next, a procedure for driving control of the aperture diaphragms according to a second exemplary embodiment will be described.

The interchangeable lens 100 and the camera 200 according to the present exemplary embodiment are configured similarly to those according to the above-described first exemplary embodiment, but are different from those of the first exemplary embodiment in that a driving upper limit speed and lower limit speed are set on the driving speed of the diaphragm unit.

In the present exemplary embodiment, the upper limit speed and the lower limit speed on the driving speed of the diaphragm unit are stored in the storage unit 105. Each value is a pulse rate of the diaphragm driving and is stored as a value in the unit of pps.

A lower limit is set on the driving speed of the diaphragm unit for the purpose of, for example, securing the aperture diameter precision. If the diaphragm unit is extremely slowly driven, desired aperture diameter precision might be unable to be achieved due to an influence of friction of a diaphragm blade or the like. Further, an upper limit is set on the driving speed of the diaphragm unit as, for example, a countermeasure against noise. If the diaphragm unit is driven at a predetermined speed or higher, noise might occur.

In the present exemplary embodiment, it is assumed that the upper limit speed and the lower limit speed on the driving of the diaphragm unit are 100 pps and 5 pps, respectively.

Next, the procedure for the driving control of the diaphragms according to the present exemplary embodiment will be described.

FIG. 4 illustrates a flowchart of processing of the diaphragm driving control according to the present exemplary embodiment.

First, in step S2-1, the camera control unit 201 notifies the lens control unit 104 of the diaphragm driving request. The lens control unit 104 is notified of the diaphragm driving request by the camera control unit 201 based on a similar trigger to the first exemplary embodiment.

In the present exemplary embodiment, the diaphragm driving request from the camera control unit 201 is specified with the aperture reduction amount and the diaphragm driving speed. The aperture reduction amount is specified with the aperture reduction operation amount in the unit of ⅛ EV. The diaphragm driving speed is specified in the form of the speed of change in the EV, unlike in the first exemplary embodiment. The diaphragm driving speed is specified in the unit of 0.01 EVs/sec, which indicates the amount of change in the EV per second.

In the following example, suppose that the aperture reduction amount specified from the camera control unit 201 is ⅖ EV similarly to that in the first exemplary embodiment, and the present aperture stop position is the position of ⅜ EV similarly to that in the first exemplary embodiment. Further, suppose that the diaphragm driving speed (the speed of change in the EV) is 13.00 EVs/sec.

Next, in step S2-2, the lens control unit 104 calculates a diaphragm driving amount corresponding to the specified aperture reduction amount for each of the diaphragm units 102R and 102L.

The processing in this step is similar processing to the processing in step S-2 according to the first exemplary embodiment, and the respective driving amounts of the diaphragm units 102R and 102L are determined in the following manner based on the correction amounts illustrated in FIG. 2.

The driving amount of the diaphragm unit 102R=2.08 steps
The driving amount of the diaphragm unit 102L=1.91 steps Next, in step S2-3, the driving speed is calculated with respect to each of the diaphragm units 102R and 102L.

First, the diaphragm driving time corresponding to the diaphragm driving speed specified by the camera 200 is calculated. Since the diaphragm unit is driven by ⅖ EV at the speed of 13.00 EVs/sec, the diaphragm driving time is calculated in the following manner.

$$\text{The diaphragm driving time} = 1000/(13/(2/8)) = 19.23 \text{ ms}$$

At this time, the driving speed of each of the diaphragm units 102R and 102L, and a status and a total driving time thereof based on the result of the calculation of the driving speed are calculated.

The status is any of four statuses, "normal setting", "limited by upper limit", "limited by lower limit", and "driving unnecessary". The status is set to "limited by upper limit" and "limited by lower limit" if the result of the calculation of the driving speed exceeds the upper limit and the lower limit, respectively. The status is set to "normal setting" if the calculation result is higher than or equal to the lower limit and lower than or equal to the upper limit. The status is set to "driving unnecessary" if the driving amount is 0 steps.

At this time, the driving speed of the diaphragm unit 102R is calculated in the following manner.

$$\text{The driving speed of the diaphragm unit } 102R = (1000/(19.23/2.08)) = 108.2 \text{ pps}$$

The driving speed of the diaphragm unit 102R exceeds the diaphragm driving upper limit speed of 100 pps. Thus, 100 pps, which is the upper limit speed, is stored as the result of the calculation of the driving speed of the diaphragm unit 102R.

Then, since the diaphragm driving speed is limited by a speed upper limit value, the status of the diaphragm unit 102R is set to "limited by upper limit".

The total driving time of the diaphragm unit 102R is calculated to be 20.8 ms.

On the other hand, the driving speed of the diaphragm unit 102L is calculated in the following manner.

$$\text{The driving speed of the diaphragm unit } 102L = (1000/(19.23/1.91)) = 99.3 \text{ pps}$$

Since the driving speed of the diaphragm unit 102L is not limited by the upper limit speed and the lower limit speed, the status of the result of the calculation of the driving speed is set to "normal setting".

Then, the total driving time of the diaphragm unit 102L is calculated to be 19.23 ms.

Next, in step S2-4, the lens control unit 104 adjusts the driving speed of each diaphragm unit.

In this process, the lens control unit 104 sets the driving speed again in such a manner that the driving times of both the diaphragm units 102R and 102L substantially match each other.

FIG. 5 illustrates a decision table indicating a processing determination for substantially matching the driving times of the diaphragm units 102R and 102L. This decision table represents which driving speed is set again and how the driving speed is set again based on respective statuses of the driving speeds of the diaphragm units 102R and 102L. The decision table is not stored in the storage unit 105 as table data but is a representation of program processing (determination or branch processing) in the form of a table.

For example, a diaphragm unit whose status is set to "normal setting" has room for the speed thereof to be adjusted to match the diaphragm set to "limited by upper limit" or "limited by lower limit", and the driving speed thereof can be set again.

If both of the diaphragm units have the statuses set to "limited by upper limit", the driving speed can be decreased, thereby allowing the speed to be adjusted to match a diaphragm unit having a longer total driving time. On the other hand, if both of the diaphragm units have the statuses set to "limited by lower limit", the driving speed can be increased, thereby allowing the speed to be adjusted to match a diaphragm unit having a shorter total driving time. If the respective results are statuses opposite to each other such as "limited by upper limit" and "limited by lower limit", both the diaphragm units have no room for the speeds thereof to be adjusted, which leaves no other choice but to drive them while maintaining the driving speeds calculated in the process of step S2-3.

In this manner, there may be some cases where it is impossible to match the driving times of the two diaphragm units 102R and 102L in such a manner that the driving times are substantially equal to each other.

If both the statuses are "normal setting", the speed adjustment is omitted. This is because, when the statuses are "normal setting", the diaphragm units 102R and 102L move at 13.00 EVs/sec and therefore takes equal driving times to move by ⅔ EV. In this case, it is to be noted that the driving speed is different between the diaphragm units 102R and 102L when being represented in the unit of pps since the driving amount (the steps) is different between the diaphragm units 102R and 102L.

In the case of the present exemplary embodiment, the status of the result of the calculation of the driving speed of the diaphragm unit 102R is "limited by upper limit", and the status of the calculation of the driving speed of the diaphragm unit 102L is "normal setting". Thus, the speed of the diaphragm unit 102L is recalculated to match the diaphragm unit 102R.

At this time, since the total driving time of the diaphragm unit 102R is 20.8 ms, the driving speed is calculated in such a manner that the total driving time of the diaphragm unit 102L becomes 20.8 ms. More specifically, the driving speed can be calculated by applying the following calculation.

The driving speed of the diaphragm unit 102$L$=
(1000/(20.8/1.91))=91.8 pps

Next, in step S2-5, the lens control unit 104 drives the diaphragm units 102R and 102L by the driving amounts and at the driving speeds determined with respect to the diaphragm units 102R and 102L, respectively.

In the above-described manner, the present configuration allows the diaphragm units 102R and 102L to be driven with the driving start and end timings thereof matched to be substantially equal to each other under almost any situation even when the upper limit and the lower limit are set on the driving speeds of the diaphragm units 102R and 102L.

The above-described exemplary embodiments have been described as the examples in which the interchangeable lens 100 includes only two single eyes, but a third exemplary embodiment will be described as an example in which the interchangeable lens 100 includes three or more single eyes.

Figure 6:
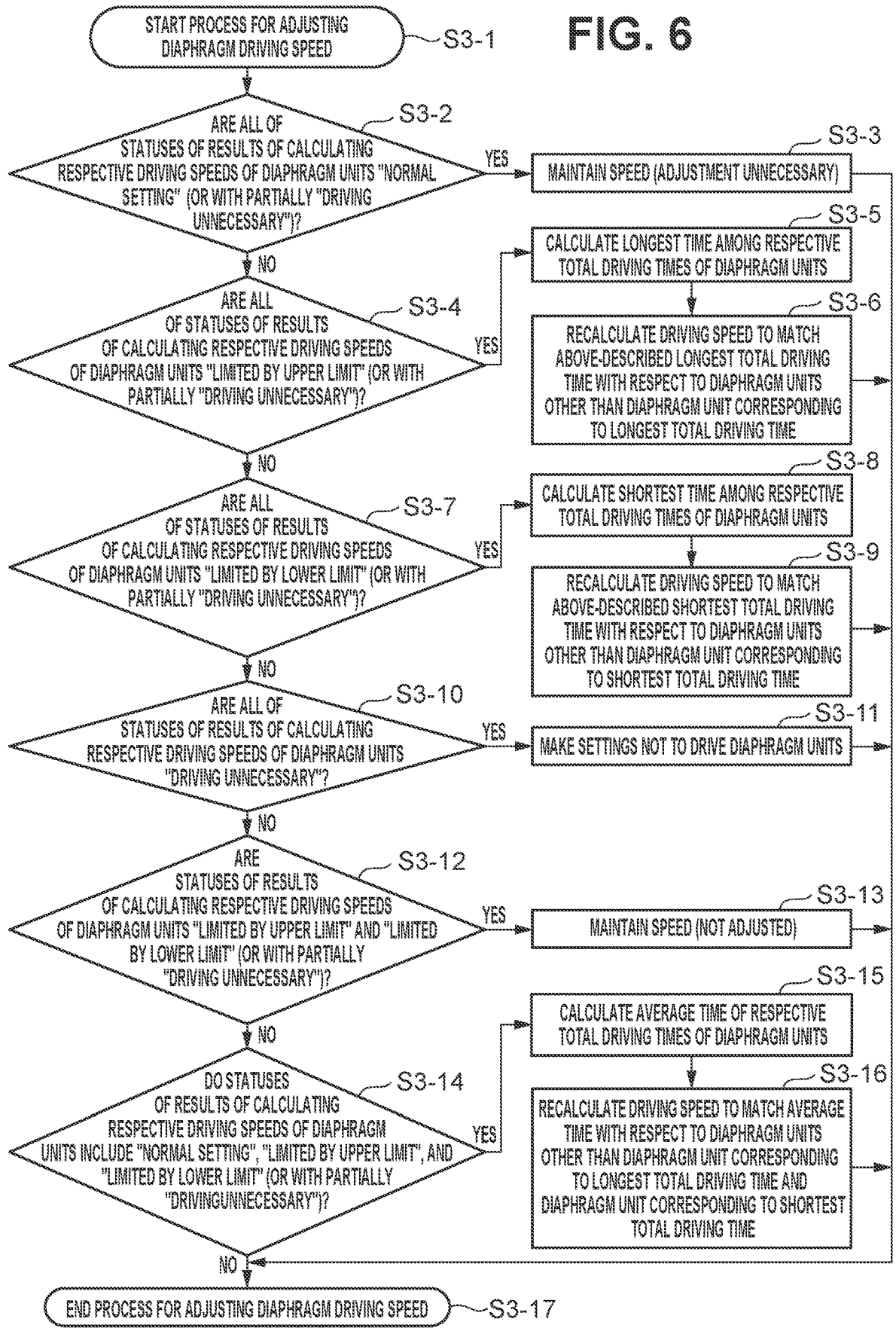
FIG. 6 is a flowchart of processing for recalculating a diaphragm driving speed.

FIG. 6 is a flowchart of processing for calculating the diaphragm driving speed when the interchangeable lens 100 including three or more single eyes is used. The processing illustrated in FIG. 6 is indicated as processing (S3-1) after the completion of the processing up to the calculation of the driving amount and driving speed of each of the three or more diaphragm units (S2-3 in FIG. 4). The following processing is performed by the lens control unit 104.

If all of the respective statuses of the diaphragm units are determined to be "normal setting" in step S3-2 (YES in step S3-2), the processing proceeds to step S3-3, determining that the driving speed adjustment is unnecessary. The speed adjustment is unnecessary among the diaphragm units set to "normal setting" as described in the second exemplary embodiment. The status of one or more of the diaphragm units may be "driving unnecessary" at this time.

In step S3-3, the speed adjustment is omitted. Then, the processing proceeds to step S3-17.

If all of the respective statuses of the diaphragm units are determined to be "limited by upper limit" in step S3-4 (YES in step S3-4), the processing proceeds to step S3-5 (the status of one or more of the diaphragm units may be "driving unnecessary" at this time). In step S3-5, the driving time of a diaphragm unit having the longest driving time among the diaphragm units is identified. Then, in step S3-6, the driving speed is recalculated so as to allow the driving times of the diaphragm units other than the diaphragm unit having the longest driving time to match the longest driving time of the diaphragm unit having the longest driving time. Then, the processing proceeds to step S3-17.

If all of the respective statuses of the diaphragm units are determined to be "limited by lower limit" in step S3-7 (YES in step S3-7), the processing proceeds to step S3-8 (the status of one or more of the diaphragm units may be "driving unnecessary" at this time). In step S3-8, the driving time of a diaphragm unit having the shortest driving time among the diaphragm units is identified. Then, in step S3-9, the driving speeds of the diaphragm units other than the diaphragm unit having the shortest driving time is recalculated so as to allow the driving times to match the shortest driving time. Then, the processing proceeds to step S3-17.

If all of the respective statuses of the diaphragm units are determined to be "driving unnecessary" in step S3-10 (YES in step S3-10), the processing proceeds to step S3-11. In step S3-11, each of the diaphragm units is set so as not to be driven. Then, the processing proceeds to step S3-17.

If the respective statuses of the diaphragm units are determined to be "limited by upper limit" and "limited by lower limit" in step S3-12 (YES in step S3-12), the processing proceeds to step S3-13 (the status of one or more of the diaphragm units may be "driving unnecessary" at this time). In step S3-13, the speed adjustment is omitted. This is because it is considered that each of the diaphragm units has almost no room for the speed thereof to be adjusted in such a manner that the driving times can be matched with one another within the upper limit and the lower limit.

If the respective statuses of the diaphragm units are determined to be "limited by upper limit", "limited by lower limit", and "normal setting" in step S3-14 (YES in step S3-14), the processing proceeds to step S3-15 (the status of one or more of the diaphragm units may be "driving unnecessary" at this time). In step S3-15, an average time of the respective total driving times of the diaphragm units is calculated. Then, in step S3-16, the driving speed is recalculated in such a manner that the driving time matches the above-described average time with respect to the diaphragm units other than the diaphragm unit having the longest total driving time and the diaphragm unit having the shortest total driving time among all the diaphragm units.

Controlling each of the diaphragm units in this manner allows a multi-eye configuration to reduce a difference in the driving timing of the diaphragm therein.

While desirable exemplary embodiments and examples of the present disclosure have been described above, the present disclosure is not limited to these exemplary embodiments and examples, and these exemplary embodiments and examples can be combined, modified, and changed in various manners within the range of the spirit of the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-163591, filed Oct. 4, 2021, which is hereby incorporated by reference herein in its entirety.

What is claimed is:

1. A control apparatus configured to control a plurality of optical systems each including an aperture diaphragm which is variable in aperture diameter, the control apparatus comprising:
a speed setting unit configured to set driving speeds of the aperture diaphragms based on driving amount information regarding respective driving amounts of the aperture diaphragms,
wherein the speed setting unit determines the driving speed of each of the aperture diaphragms so as to reduce a difference between driving times of the aperture diaphragms of the plurality of optical systems.

2. The control apparatus according to claim 1, wherein the speed setting unit determines the driving speeds of the aperture diaphragms such that the driving times of the aperture diaphragms of the plurality of optical systems match each other.

3. The control apparatus according to claim 1, further comprising a driving amount setting unit configured to set the driving amount information regarding the driving amount of each of the aperture diaphragms.

4. The control apparatus according to claim 3, wherein the driving amount setting unit sets pieces of driving amount information respectively for the aperture diaphragms of the plurality of optical systems.

5. The control apparatus according to claim 1, further comprising a storage unit configured to store correction amount information to correct the driving amounts of the aperture diaphragms.

6. The control apparatus according to claim 1, wherein the speed setting unit calculates a first driving time of each of the aperture diaphragms based on the driving amount information and a first driving speed common to the aperture diaphragms of the plurality of optical systems, and calculates a driving speed of at least one of the aperture diaphragms so as to reduce the difference between the driving times of the aperture diaphragms of the plurality of optical systems compared to when the at least one of the aperture diaphragms is driven at the first driving speed.

7. The control apparatus according to claim 6,
wherein the control apparatus is provided in an interchangeable lens in a camera system including the interchangeable lens and a camera main body, and
wherein the first driving speed is a speed specified by the camera main body to the interchangeable lens.

8. The control apparatus according to claim 1, wherein the speed setting unit sets the aperture diaphragm of one optical system of the plurality of optical systems as a reference and determines a driving speed of the aperture diaphragm of an other optical system of the plurality of optical systems such that the driving times of the respective aperture diaphragms match each other.

9. The control apparatus according to claim 8,
wherein an upper limit or a lower limit is set on the driving speeds of the respective aperture diaphragms, and
wherein, if the driving speed of the aperture diaphragm of the one optical system exceeds the upper limit or the lower limit, the speed setting unit sets the driving speed of the aperture diaphragm of the one optical system to the upper limit or the lower limit and determines the driving speed of the aperture diaphragm of the other optical system such that the driving times of the respective aperture diaphragms match each other.

10. The control apparatus according to claim 8,
wherein the one optical system of the plurality of optical systems is used to acquire an image serving as a reference for automatic exposure, and
wherein the speed setting unit sets the aperture diaphragm of the one optical system as a reference and determines the driving speed of the aperture diaphragm of the other optical system such that the driving times match each other.

11. The control apparatus according to claim 8,
wherein the one optical system of the plurality of optical systems is used to acquire an image serving as a reference for in-focus determination, and
wherein the speed setting unit sets the aperture diaphragm of the one optical system as a reference and determines the driving speed of the aperture diaphragm of the other optical system such that the driving times match each other.

12. A control method for controlling a plurality of optical systems each including an aperture diaphragm variable in aperture diameter, the control method comprising:
setting driving speeds of the aperture diaphragms based on driving amount information regarding respective driving amounts of the aperture diaphragms,
wherein, in setting the driving speeds, the driving speed of each of the aperture diaphragms is determined so as to reduce a difference between driving times of the aperture diaphragms of the plurality of optical systems.

13. A non-transitory computer-readable storage medium storing a program for causing a computer to perform a control method for controlling a plurality of optical systems each including an aperture diaphragm variable in aperture diameter, the control method comprising:
setting driving speeds of the aperture diaphragms based on driving amount information regarding respective driving amounts of the aperture diaphragms,
wherein, in setting the driving speeds, the driving speed of each of the aperture diaphragms is determined so as to reduce a difference between driving times of the aperture diaphragms of the plurality of optical systems.

* * * * *